Patented May 6, 1952

2,595,625

UNITED STATES PATENT OFFICE 2,595,625

COPOLYMERS OF POLYESTERS AND CONJUGATED DIENES

Robert J. Agnew, Pawling, N. Y., assignor to The Texas Company, New York, N. Y., a corporation of Delaware No Drawing. Application August 21, 1948, Serial No. 45,569

10 Claims. (Cl. 260—45.4)

This invention relates to the preparation of novel, clear, thermosetting molding resins. More specifically, this invention relates to the preparation of thermosetting resins which are copolymers of a conjugated diene and an unsaturated polyester. The clear, thermosetting and moldable copolymers of this invention are characterized by chemical inertness to acid, alkali and common organic solvents.

The copolymers of this invention are prepared by the reaction of a conjugated diene with an unsaturated polyester formed by the reaction of a glycol with an alpha-olefinic unsaturated dibasic acid. The unsaturated polyester component of the copolymer can also be formed by the reaction of a glycol with a mixture of saturated and unsaturated dibasic acids, at least 25 per cent of which mixture is an alpha-olefinic unsaturated dibasic acid.

The moldable copolymer of this invention comprises 5 to 35 per cent conjugated diene and 65 to 95 per cent unsaturated polyester; preferably the copolymer contains 10 to 20 per cent conjugated diene and 80 to 90 per cent unsaturated polyester.

The copolymers of this invention are molded by heat and pressure to form a substantially colorless and transparent product. The thermosetting resins thus produced exhibit a high degree of inertness to acid, alkali and common organic solvents such as alcohol and acetone. The ability of these copolymers to be molded into chemically resistant, clear, colorless, thermosetting materials characterizes them as particularly useful materials for decorative moldings, electrical insulators, industrial and household appliances, etc. The usual thermosetting resins form opaque or dark colored products.

Butadiene, isoprene, chloroprene, piperylene are examples of conjugated dienes that may be employed to prepare the clear, thermosetting moldable resins of this invention. Butadiene is one of the preferred reagents. The properties of the copolymers are modified depending upon the diene that is copolymerized with the unsaturated polyester. In general, however, regardless of the conjugated diene employed, all of the copolymers contain the desirable properties which have been heretofore ascribed to the copolymers which form the subject matter of this invention, namely they are clear, chemically resistant, thermosetting and moldable.

The polyester component of the copolymer is prepared by condensing a dihydric alcohol, such as ethylene glycol, diethylene glycol, propylene glycol, vinyl ethylene glycol with an alpha-olefinic unsaturated dibasic acid or its anhydride. Hereafter, whenever it is stated that a dibasic acid is employed, it will be understood that its anhydride may be substituted therefor without any change whatsoever in the properties of the resulting polyester. A mixture of saturated and unsaturated dibasic acids may be employed instead of an alpha-olefinic unsaturated dibasic acid alone, provided at least 25 per cent of the mixture is an alpha-olefinic unsaturated dibasic acid. Maleic, fumaric and itaconic acids are examples of alpha-olefinic unsaturated dibasic acids employed for the production of the unsaturated polyester. Alpha-olefinic unsaturated dibasic acids, which form at least 25 per cent of the dibasic acids employed in the production of the unsaturated polyester, have the following general formula:

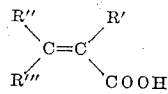

wherein R', R'' and R''' are either hydrogen atoms, alkyl groups, alkenyl groups, cyclo-alkyl groups, carboxyl groups or their substitution products, at least one of the R', R'' and R''' groups being a carboxylic acid group or a carboxylic acid-substituted group.

The best results are obtained when the unsaturated polyester is formed by the condensation of a dihydroxy alcohol with a mixture of dibasic acids comprising more than 50 per cent alpha-olefinic unsaturated dibasic acid. Properties of the copolymer are affected to a slight extent by the nature of the alpha-olefinic unsaturated dibasic acid employed in the preparation of the unsaturated polyester and also by the percentage of alpha-olefinic unsaturated dibasic acid employed in the preparation of the unsaturated polyester.

Advantageously, a dihydroxy alcohol employed in the preparation of the unsaturated polyester contains two primary alcohol groups because esterification is effected more readily therewith. Ethylene glycol, 1,4-butanediol and 1,6-hexanediol are examples of preferred dihydroxy alcohols with ethylene glycol being an especially preferred reagent. Other dihydroxy alcohols containing a secondary alcohol group such as propylene glycol, 1,2-butylene glycol, 1,2-hexanediol are also employed to prepare the novel copolymers of this invention. Moreover, ether glycols such as diethylene glycol, triethylene glycol may also be employed for the preparation of the unsaturated polyesters. In general, however, the use of ether glycols results in the formation of softer copolymers than does the employment of dihydroxy alkanes such as ethylene glycol.

The mixed polyesters are prepared by reacting a dihydroxy alcohol such as ethylene glycol with an alpha-olefinic unsaturated dibasic acid or a mixture of dibasic acids comprising at least 25 per cent alpha-olefinic unsaturated dibasic acid at a temperature of 150 to 225° C. The polyesterification is advantageously effected in the presence of an inert gas in order to prevent cross-linking between the unsaturated polyester molecules by the formation of oxygen linkages between the activated double bonds of the alpha-olefinic unsaturated dibasic acid units of the polyester. Oxygen may be excluded either by passing the inert gas over the surface of the reactants or by bubbling the gas through the liquid reactants. Bubbling of the inert gas through the liquid reactants has the advantages of agitating the mixture and of carrying away at least part of the water formed during the reaction. The esterification reaction is continued until the polyester contains at least 3 condensation units per molecule and preferably 5 to 20 condensation units per molecule. It is advisable that the polyester be soluble in acetone or in an acetone-ethylene dichloride mixture. Advantageously, therefore, polyesterification is stopped before the formation of an acetone-insoluble or an acetone-ethylene dichloride-insoluble product which occurs in the range of about 20 condensation units per molecule.

It is generally preferable to employ a slight excess, for example, 0.05 to 0.1 mol excess of glycol in order to hasten the condensation reaction. Moreover, it is also possible to employ an inert solvent such as toluene for the preparation of a mixed polyester. When a solvent is employed, the reactants are heated in a solvent mixture under reflux and the water split out during the esterification is separated from the condensed solvent prior to the return of the solvent to the reaction zone. After esterification has proceeded to the desired extent, the solvent is stripped from the polyester in vacuum. An inert gas is also used to prevent oxygen cross-linking when a solvent is employed during the polyesterification reaction.

Copolymerization of conjugated diene with the unsaturated polyester is effected by a dispersion polymerization technique at a temperature between about 70 and 120° F. and preferably at a temperature between about 80 and 100° F. The reaction time depends upon temperature and catalyst concentration but normally varies between about 2 and about 12 hours. Dispersion polymerization comprises reaction of one or more polymerizable materials dispersed in small globules by mechanical agitation in a non-solvent and in the presence of a monomer-soluble catalyst.

The unsaturated polyester is dissolved in a suitable solvent such as acetone or ethylene dichloride prior to copolymerization. The polyester solution and the diene are then dispersed in water or a mixture of water and ethylene glycol; the reactants are maintained in the dispersed state by continuous shaking or stirring of the reaction mixture.

Copolymerization is conducted in the presence of an organic peroxide catalyst such as benzoyl peroxide; an acid peroxide such as acetyl peroxide, benzoyl peroxide, phthalic peroxide and succinic peroxide is preferred for the copolymerization. Other peroxides such as tertiary butyl hydro-peroxide may also be used to catalyze the copolymerization reaction. In order to prevent agglomeration of the copolymer during the later stages of copolymerization, in what is commonly referred to as the sticky stage, it has been found advisable to add a suitable dispersion stabilizer such as gelatin. The use of a dispersion stabilizer such as gelatin prevents agglomeration of the novel copolymer of this invention before copolymerization has reached the desired stage.

At the conclusion of the reaction period, the copolymerization mixture is mixed with an equal volume of ethyl alcohol and water and is then filtered. The solid product is washed with additional alcohol-water mixture and is then dried under a vacuum of approximately 15-25 inches of mercury at a temperature of approximately 125° F.

The product is obtained in forms varying from soft rubbery gels to small, hard, clear beads, dependent upon the constituents and copolymerization conditions employed. The copolymer thus produced can be compression molded at temperatures of 200 to 300° F. and pressures of 1,000 to 10,000 pounds per square inch for periods of about 1 to 15 minutes. Thereby there are formed hard, clear, colorless articles having desirable physical and chemical properties. As will be shown hereafter, these products exhibit extraordinary chemical inertness and have physical properties which adapt them for industrial moldings, etc.

As has been indicated previously, it is possible to vary the physical and chemical properties of the novel thermosetting moldable copolymers prepared by the reaction of a conjugated diene with an alpha-olefinic unsaturated dibasic acid or a mixture of dibasic acids containing at least 25 per cent alpha-olefinic unsaturated dibasic acid. Physical and chemical properties may be varied by changing the composition and degree of condensation of the unsaturated polyester, by altering the ratio of unsaturated polyester to diene and by modifying the copolymerization conditions. By changing the aforementioned variables, the character of the copolymers can be varied to some extent. All of the copolymers of the type described are moldable, thermosetting resins which are clear, colorless and characterized by chemical inertness. The following examples will illustrate the procedure employed for the preparation of the novel compounds of this invention.

*Example I*

An ethylene glycol maleate polyester was prepared by reacting 341 grams of ethylene glycol and 490 grams of maleic anhydride in an atmosphere of carbon dioxide at 348° F. for approximately 3 hours and then at 375° F. for approximately 5 hours. The final product had 12.6 calculated condensation units per molecule.

Nine parts by weight of this polyester was dissolved in 24 parts of acetone. This was added to a bottle containing 24 parts water, 0.18 part of gelatin and 0.1 part of benzoyl peroxide. To the contents of this bottle was added slightly more than 1 part of butadiene and the excess over 1.0 part of the butadiene was allowed to volatilize off to flush out any air present in the bottle. The bottle was then sealed with a tinfoil lined cap.

The bottle and contents were rotated in a water bath controlled at 80° F. for 10 hours. At the conclusion of the reaction period the contents of the bottle were diluted with an equal volume of a mixture of equal parts of water and formula 30 alcohol (denatured ethyl alcohol comprising about 90 volume per cent of 190 proof alcohol and 10 per cent methyl alcohol). This was filtered on a Buchner funnel and the solid copolymer washed twice with the alcohol-water mixture. The product was then dried in a vacuum of approximately 15 inches of mercury at 125° F. for 20 hours. The final product was obtained as partially agglomerated, white beads approximately 0.5 mm. in diameter.

The solid copolymer was compression molded at 250° F. for 10 minutes under 5,000 pounds per square inch pressure. The resultant molded specimens were light yellow, hazy, hard materials having physical and chemical properties given under "1" in Table I.

*Example II*

An ethylene glycol maleate polyester was prepared by reacting 500 grams of ethylene glycol with 785 grams of maleic anhydride for 5.5 hours at approximately 350° F. The final product had 5.2 calculated condensation units per molecule.

Nine parts of this polyester was reacted with 1 part by weight of butadiene for 9 hours at 80° F. using the same procedure as in Example I. The resultant copolymer was compression molded at 250° F. for 10 minutes under 5,000 pounds per square inch pressure. The molded specimens were light yellow, hazy, hard materials having physical and chemical properties given under "2" in Table I.

*Example III*

Nine parts of ethylene glycol maleate polyester prepared as in Example II was reacted with one part of isoprene for 12 hours at 80° F. using conditions identical to those given in Example I except that the reaction bottle was flushed with nitrogen to displace the air after the isoprene was added. The resultant copolymer was compression molded at 250° F. for ten minutes under 5,000 pounds per square inch pressure to yield relatively hard, light yellow, hazy products exhibiting the physical properties shown under "3" in Table I.

*Example IV*

An ethylene glycol maleate polyester was prepared by reacting 341 grams of ethylene glycol and 490 grams of maleic anhydride in an atmosphere of carbon dioxide at 348° F. for 2 hours and then at 375° F. for 4 hours. The final product had 9.9 calculated condensation units per molecule.

Nine parts of this polyester was reacted with 1.5 parts of chloroprene at 80° F. for 10 hours using other conditions identical to those in Example III. The resultant copolymers were compression molded at 250° F. for 10 minutes under 5,000 pounds per square inch. The molded material was relatively hard, yellow and hazy and exhibited the physical and chemical properties given under "4" in Table I.

*Example V*

Eight parts by weight of ethylene glycol maleate polyester having 5.4 calculated condensation units per molecule were reacted with 2 parts of butadiene at 100° F. for 2 hours in the presence of 20 parts of acetone, 30 parts of water, 0.18 part of gelatin and 0.05 part of benzoyl peroxide. The resultant copolymer was obtained in the form of soft, transparent beads, which were molded at 300° F. for 10 minutes under 3,000 pounds per square inch pressure to yield disks having a Rockwell hardness of R–109. A similar run was made using identical conditions except that no butadiene was added to the mixture. No solid copolymer was formed.

*Example VI*

An ethylene glycol maleate-phthalate polyester was prepared by reacting 323 grams of ethylene glycol with 245 grams of maleic anhydride and 370 grams of o-phthalic anhydride in an atmosphere of carbon dioxide at 348° F. for 3½ hours and then at 375° F. for 8 hours. The polyester obtained had 7.3 calculated condensation units per molecule.

Eight parts by weight of this polyester was reacted with 2 parts of butadiene in the presence of 20 parts of acetone, 30 parts of water, 0.18 part gelatin and 0.10 part of benzoyl peroxide. The copolymerization was conducted at 100° F. for 3 hours to yield hard, semi-transparent, small beads. This product was compression molded at 250° F. for 10 minutes under 3,000 pounds per square inch pressure to yield clear, hard, very light yellow materials exhibiting a Shore durometer hardness of 99.

*Example VII*

Diethylene glycol maleate polyester was prepared by reacting 750 grams of diethylene glycol with 685 grams of maleic anhydride at approximately 350° F. for 10 hours in an atmosphere of carbon dioxide. The final polyesters contained 8.3 calculated condensation units per molecule.

Eight parts by weight of this polyester were copolymerized with two parts of butadiene in the presence of 20 parts acetone, 30 parts water, 0.18 part gelatin and 0.10 part benzoyl peroxide for 4 hours at 100° F. The product was in the form of soft, semi-transparent, tacky beads. This copolymer was molded at 300° F. for 10 minutes under 3,000 pounds per square inch to form clear, light yellow, slightly rubbery specimens having a Shore durometer hardness of 100+.

*Example VIII*

An ethylene glycol fumarate phthalate polyester was prepared by reacting 171 grams of ethylene glycol with 145 grams of fumaric acid and 185 grams of phthalic anhydride in an atmosphere of carbon dioxide at 348° F. for 4 hours and then at 375° F. for 2½ hours. The polyester obtained had 7.4 calculated condensation units per molecule.

Nine parts by weight of this polyesters was reacted with one part of butadiene in the presence of 24 parts of acetone, 24 parts of water, 0.18 part gelatin and 0.10 part benzoyl peroxide. The copolymerization was conducted at 80° F. for 12 hours to yield hard, fine, agglomerated beads. This product was compression molded at 250° F. for 10 minutes under 3,000 pounds per square inch pressure to yield clear, hard, very light yellow disks having Rockwell hardness of R–104.

In Table I, there are detailed a number of physical and chemical properties of the copolymers prepared in Examples I through IV.

Table I

| Copolymer No. | 1 | 2 | 3 | 4 |
|---|---|---|---|---|
| Physical tests: | | | | |
| Rockwell Hardness | M-109 | M-109 | R-96 | R-119 |
| Flexural Strength, p. s. i. | 13,800 | 10,400 | 4,350 | 10,100 |
| Compressive Strength, p. s. i. | 16,000 | 13,900 | 6,000 | 11,600 |
| Heat distortion temperature (264 p. s. i.) °F | 152 | -------- | -------- | -------- |
| Izod impact Strength, Ft. lb./in. | 0.40 | 0.47 | 0.45 | 0.29 |
| Resistance to Chemicals—Percent Change in Weight: | | | | |
| 1% NaOH | -2.0 | -16.1 | -------- | -4.4 |
| 30% H$_2$SO$_4$ | 0.50 | 0.59 | -------- | 0.60 |
| 95% C$_2$H$_5$OH | 0.67 | 0.52 | -------- | 0.95 |
| 50% C$_2$H$_5$OH | 1.20 | 1.44 | -------- | 2.1 |
| 100% CH$_3$COCH$_3$ | 1.24 | 2.03 | -------- | 6.4 |
| Distilled water | 1.13 | 1.23 | -------- | 1.2 |

The general chemical inertness of the copolymers of this invention is well illustrated in Table I. In general, the novel copolymers are little affected by alkali, acid and common organic solvents such as alcohol and acetone.

Obviously many modifications and variations of the invention, as hereinbefore set forth, may be made without departing from the spirit and scope thereof and, therefore, only such limitations should be imposed as are indicated in the appended claims.

I claim:

1. A process for preparing moldable thermosetting resins which comprises copolymerizing at a temperature of about 70 to 120° F. a mixture of polymerizable materials consisting of (A) 5 to 35 per cent conjugated alkadiene containing 4 to 5 carbon atoms, and (B) 65 to 95 per cent unsaturated polyester containing at least 3 condensation units per molecule and formed by esterification of a dihydroxy alcohol with an alpha-olefinic dicarboxylic acid, said copolymerization being effected by dispersing said polymerizable materials in small globules in an aqueous, non-solvent medium in the presence of a peroxide catalyst and acetone, and containing said reaction until a moldable, thermosetting product is formed.

2. The process according to claim 1 in which butadiene is copolymerized with a polyester formed by esterification of ethylene glycol with maleic acid.

3. The process according to claim 1 in which isoprene is copolymerized with a polyester formed by esterification of ethylene glycol with maleic acid.

4. A process for preparing moldable thermosetting resins which comprises copolymerizing at a temperature of about 70 to 120° F. a mixture of polymerizable materials consisting of (A) 5 to 35 per cent conjugated alkadiene containing 4 to 5 carbon atom, and (B) 65 to 95 per cent unsaturated polyester containing at least 3 condensation units per molecule and formed by esterification of a dihydroxy alcohol with a mixture of dicarboxylic acids, at least 25 per cent of said mixture being an alpha-olefinic acid, said copolymerization being effected by dispersing said polymerizable materials in small globules in an aqueous, non-solvent medium in the presence of a peroxide catalyst and acetone, and continuing said reaction until a moldable, thermosetting product is formed.

5. A process according to claim 4 in which the conjugated diene constitutes 10 to 20 per cent of said polymerizable materials and the unsaturated polyesters constitutes 80 to 90 per cent of said polymerizable materials.

6. A process according to claim 4 in which butadiene is the conjugated alkadiene.

7. A process according to claim 4 in which isoprene is the conjugated alkadiene.

8. A process according to claim 4 in which piperylene is the conjugated alkadiene.

9. A process according to claim 4 in which the polyester contains 5 to 20 condensation units per molecule.

10. A process according to claim 4 in which the copolymerization is effected at a temperature between 80 and 100° F.

ROBERT J. AGNEW.

REFERENCES CITED

The following references are of record in the file of this patent:

UNITED STATES PATENTS

| Number | Name | Date |
|---|---|---|
| 2,255,313 | Ellis | Sept. 9, 1941 |
| 2,266,794 | Pannwitz et al. | Dec. 23, 1941 |
| 2,369,689 | Robie et al. | Feb. 20, 1945 |
| 2,407,479 | D'Alelio | Sept. 10, 1946 |
| 2,418,633 | Gould | Apr. 8, 1947 |
| 2,443,735 | Kropa | June 22, 1948 |
| 2,491,409 | Kropa et al. | Dec. 13, 1949 |